US009852119B2

(12) United States Patent
Yamahara

(10) Patent No.: US 9,852,119 B2
(45) Date of Patent: Dec. 26, 2017

(54) DEVICE FOR SECURING CONTENTS OF A WEB PAGE

(71) Applicant: Rakuten, Inc., Tokyo (JP)

(72) Inventor: Hisanori Yamahara, Tokyo (JP)

(73) Assignee: Rakuten, Inc., Tokyo (JP)

( * ) Notice: Subject to any disclaimer, the term of this patent is extended or adjusted under 35 U.S.C. 154(b) by 163 days.

(21) Appl. No.: 14/784,108

(22) PCT Filed: Sep. 27, 2013

(86) PCT No.: PCT/JP2013/076413
§ 371 (c)(1),
(2) Date: Oct. 13, 2015

(87) PCT Pub. No.: WO2015/045130
PCT Pub. Date: Apr. 2, 2015

(65) Prior Publication Data
US 2016/0062975 A1 Mar. 3, 2016

(51) Int. Cl.
*G06F 17/24* (2006.01)
*G06F 21/31* (2013.01)
(Continued)

(52) U.S. Cl.
CPC .......... *G06F 17/243* (2013.01); *G06F 3/0484* (2013.01); *G06F 17/2247* (2013.01);
(Continued)

(58) Field of Classification Search
CPC ............... G06F 17/2247; G06F 17/243; G06F 17/30867; G06F 3/0484; G06F 21/31;
(Continued)

(56) References Cited

U.S. PATENT DOCUMENTS 6,353,449 B1 * 3/2002 Gregg ..................... G09G 5/14
715/762
2003/0076351 A1 4/2003 Ide et al.
(Continued)

FOREIGN PATENT DOCUMENTS

JP 7140947 A 6/1995
JP 2000259272 A 9/2000
(Continued)

OTHER PUBLICATIONS

JP 2013-101 421 A English Translation; Japanese Patent Office; Japan Platform for Patent Information; pp. 1-22.*
(Continued)

*Primary Examiner* — Andrew Dyer
(74) *Attorney, Agent, or Firm* — Sughrue Mion, PLLC

(57) ABSTRACT

A web page providing device includes a receiving unit and a transmitting unit. The receiving unit is configured to receive a request for a web page from a terminal. The transmitting unit is configured to transmit to the terminal the web page from which a script is readable. The script causes the terminal to execute: measuring an elapsed time from a most recent operation and determining whether the elapsed time exceeds a predetermined time; when it is determined that the elapsed time exceeds the predetermined time, changing a display mode of the web page from a normal display mode to another display mode returning the display mode of the web page to the normal display mode in a case where a reset operation is performed by the user of the terminal when the display mode of the web page is the other display mode.

9 Claims, 10 Drawing Sheets

(51) Int. Cl.
| | |
|---|---|
| G06F 21/62 | (2013.01) |
| G06F 3/0484 | (2013.01) |
| G06F 17/22 | (2006.01) |
| H04L 29/08 | (2006.01) |
| G06F 17/30 | (2006.01) |

(52) U.S. Cl.
CPC ........ *G06F 17/30867* (2013.01); *G06F 21/31* (2013.01); *G06F 21/6245* (2013.01); *H04L 67/02* (2013.01); *H04L 67/141* (2013.01); *G06F 2221/032* (2013.01)

(58) Field of Classification Search
CPC ........... G06F 21/6245; G06F 2221/032; H04L 67/141; H04L 67/02
USPC ..................... 715/221, 224; 726/5, 7, 17, 19
See application file for complete search history.

(56) References Cited

U.S. PATENT DOCUMENTS

| | | | | |
|---|---|---|---|---|
| 2004/0250130 | A1* | 12/2004 | Billharz | H04L 63/0272 726/15 |
| 2007/0008937 | A1* | 1/2007 | Mody | H04L 12/14 370/338 |
| 2007/0300178 | A1* | 12/2007 | McArdle | G06F 3/0481 715/781 |
| 2011/0106940 | A1* | 5/2011 | Chauvin | G06F 11/0757 709/224 |
| 2013/0014251 | A1 | 1/2013 | Nogami | |
| 2013/0036355 | A1* | 2/2013 | Barton | H04N 21/47211 715/719 |
| 2013/0167224 | A1 | 6/2013 | Horiuchi et al. | |
| 2013/0297933 | A1* | 11/2013 | Fiducia | H04L 63/0853 713/156 |

FOREIGN PATENT DOCUMENTS

| | | |
|---|---|---|
| JP | 2003131864 A | 5/2003 |
| JP | 2006133595 A | 5/2006 |
| JP | 2008217669 A | 9/2008 |
| JP | 2013101421 A | 5/2013 |
| JP | 2013131164 A | 7/2013 |
| WO | 2011115249 A1 | 9/2011 |

OTHER PUBLICATIONS

Communication dated Jan. 7, 2014, issued by the International Bureau in corresponding International Application No. PCT/JP2013/076413, pp. 4.

International Preliminary Report on Patentability for PCT/JP2013/076413 dated Apr. 7, 2016, pp. 12.

* cited by examiner

DELIVERY ADDRESS INFORMATION
CONFIRMATION PAGE

NAME: RAKUTEN TARO  ← C1
ADDRESS: HIGASHI-SHINAGAWA, SHINAGAWA-KU, TOKYO  ← C2
TELEPHONE NUMBER:  ← C3

[OK]  [CANCEL]

(b)

DELIVERY ADDRESS INFORMATION
CONFIRMATION PAGE

NAME: ▓▓▓▓ ← M
ADDRESS: ▓▓▓▓ ← M
TELEPHONE NUMBER: ▓▓▓▓ ← M

[OK]  [CANCEL]

DEVICE FOR SECURING CONTENTS OF A WEB PAGE

CROSS REFERENCE TO RELATED APPLICATIONS

This is a National Stage of International Application No. PCT/JP2013/076413 filed Sep. 27, 2013, the contents of which are incorporated herein by reference in its entirety.

TECHNICAL FIELD

An embodiment of the present invention relates to a web page providing device, a web page providing method, and a web page providing program.

BACKGROUND ART

A technique for changing a screen appearing on a terminal to a lock screen when a user operation is not accepted for a predetermined time or longer in order to prevent others from peeping at the screen on the terminal is conventionally known. For example, Patent Literature 1 below describes an info nation processing apparatus that determines whether display information appearing on a display includes confidential information and, if the display information includes confidential information, reduces the time required to change to a lock screen.

CITATION LIST

Patent Literature

[Patent Literature 1] Japanese Patent Application Laid-Open Publication No. 2006-133595

SUMMARY OF INVENTION

Technical Problem

However, whether screen lock is run depends on the settings on the terminal side, and screen lock is not always run automatically. If the terminal is not set such that screen lock is automatically run, others may peep at the web page appearing on the terminal.

A mechanism capable of preventing others from peeping at the contents of a web page appearing on a terminal independently of the settings on the terminal has been in demand.

Solution to Problem

A web page providing device according to an embodiment of the present invention includes a receiving unit configured to receive a request for a web page from a terminal and a transmitting unit configured to transmit to the terminal the web page from which a script that describes processing to be executed by the terminal is readable. The script causes the terminal to execute: a determination step of measuring an elapsed time from a most recent operation on the terminal by a user of the terminal and determining whether the elapsed time exceeds a predetermined time; a display mode changing step of, when it is determined that the elapsed time exceeds the predetermined time in the determination step, changing a display mode of the web page from a normal display mode to another display mode in which visibility of at least part of the web page is reduced; and a display mode restoring step of returning the display mode of the web page to the normal display mode in a case where a reset operation is performed by the user of the terminal when the display mode of the web page is the other display mode.

A web page providing method according to an embodiment of the present invention includes a receiving step of receiving a request for a web page from a terminal and a transmitting step of transmitting to the terminal the web page from which a script that describes processing to be executed by the terminal is readable. The script causes the terminal to execute: a determination step of measuring an elapsed time from a most recent operation on the terminal by a user of the terminal and determining whether the elapsed time exceeds a predetermined time; a display mode changing step of, when it is determined that the elapsed time exceeds the predetermined time in the determination step, changing a display mode of the web page from a normal display mode to another display mode in which visibility of at least part of the web page is reduced; and a display mode restoring step of returning the display mode of the web page to the normal display mode in a case where a reset operation is performed by the user of the terminal when the display mode of the web page is the other display mode.

A web page providing program according to an embodiment of the present invention causes a computer to function as a receiving unit configured to receive a request for a web page from a terminal and a transmitting unit configured to transmit to the terminal the web page from which a script that describes processing to be executed by the terminal is readable. The script causes the terminal to execute: a determination step of measuring an elapsed time from a most recent operation on the terminal by a user of the terminal and determining whether the elapsed time exceeds a predetermined time; a display mode changing step of, when it is determined that the elapsed time exceeds the predetermined time in the determination step, changing a display mode of the web page from a normal display mode to another display mode in which visibility of at least part of the web page is reduced; and a display mode restoring step of returning the display mode of the web page to the normal display mode in a case where a reset operation is performed by the user of the terminal when the display mode of the web page is the other display mode.

In the present embodiment, in response to the request from the terminal, the web page from which the script that describes processing to be executed by the terminal is readable is transmitted to the terminal. This script causes the terminal to execute the processing of when the elapsed time from the most recent operation on the terminal by the user exceeds a predetermined time, changing the display mode of the web page such that the visibility of at least part of the web page is reduced; and when the reset operation is thereafter performed by the user of the terminal, returning the display mode of the web page to the normal display mode. According to the present embodiment, if no user operation is performed over a predetermined time, the read script reduces the visibility of at least part of the web page to make it difficult for others to recognize the contents of the web page appearing on the terminal The present embodiment therefore can prevent others from peeping at the contents of the web page appearing on the terminal, independently of the settings on the terminal.

According to an embodiment, the web page may include an entry form configured to receive text information. When the display mode of the web page is the other display mode, the script may cause the terminal to further execute an authentication request step of displaying an authentication screen for allowing the user to input a password. In the display mode restoring step, when the password input in the authentication screen matches at least part of the text information input to the entry form, it may be determined that the reset operation is performed.

This embodiment can prevent others who do not know the text information input to the entry form from returning the display mode of the web page to the normal display mode.

According to an embodiment, when it is determined that the elapsed time exceeds the predetermined time, the script may cause the terminal to further execute:

an input information transmitting step of transmitting the text information input in the entry form to the web page providing device; and a password transmitting step of transmitting the password input by the user in the authentication screen to the web page providing device. The web page providing device may further include an authentication unit configured to determine whether the password transmitted in the password transmitting step matches at least part of the text information transmitted in the input information transmitting step, and, when it is determined that the password and the text information match, transmit information indicating authentication success to the terminal. In the display mode restoring step, when the information indicating authentication success is accepted from the web page providing device, it may be determined that the reset operation is performed.

If authentication is performed at the terminal, a correct password may be exposed to others, for example, using a debug mode. In the present embodiment, the authentication unit of the web page providing device determines whether the password input in the authentication screen matches the text information input in the entry form, thereby preventing exposure of the password to others. As a result, others are more reliably prevented from peeping at the contents of the web page appearing on the terminal According to an embodiment, the web page may be an order page for inputting information necessary for purchasing an item. In the display mode restoring step, when the item becomes out of stock while the display mode of the order page is set in the other display mode, the display mode of the order page may be returned to the normal display mode without requesting input of a password in the authentication screen.

It is unlikely that the user proceeds to an item purchase procedure from the order page when the item is out of stock. According to this embodiment, input of the password in the authentication screen is not requested when the item is out of stock, thereby avoiding causing the user to perform an unnecessary operation.

According to an embodiment, the web page providing device may further include a session management unit configured to manage a session state with the terminal. In the display mode restoring step, when a session with the terminal is disconnected while the display mode of the web page is set in the other display mode, the display mode of the web page may be returned to the normal display mode without requesting input of a password in the authentication screen.

It is unlikely that the user continues to view the web page after the session with the terminal is disconnected. According to this embodiment, input of the password in the authentication screen is not requested when the session with the terminal is disconnected, thereby avoiding causing the user to perform an unnecessary operation.

According to an embodiment, in the display mode changing step, when the web page appearing on the terminal is an entry page including an entry form configured to receive text information, the display mode of the entry page may be changed such that visibility of text information input in the entry form is reduced. When the web page appearing on the terminal is a confirmation page for confirming information input in the entry page, a display mode of the confirmation page may be changed such that text information input in the entry form is indistinguishable from information not input in the entry form.

According to this embodiment, when the web page appearing on the terminal is the entry page, the display mode of the entry page is changed such that the visibility of the text information input in the entry form is reduced, so that the user can grasp which entry form has been filled in. In addition, when the web page appearing on the terminal is the confirmation page, the display mode of the confirmation page is changed such that the text information input in the entry form is indistinguishable from the information not input in the entry form, thereby preventing others from knowing which entry form the user has filled in and which entry form the user has not filled in.

According to an embodiment, the script may acquire a wait time until screen lock is run in the terminal, and may set the predetermined time to be shorter than the wait time.

According to this embodiment, changing the display mode by the script can be combined with the screen lock by the terminal.

According to an embodiment, in the display mode changing step, a time elapsed from a point of time when the display mode of the web page is set to the other display mode may be measured, and the content of the reset operation may be changed such that difficulty of the reset operation increases as the elapsed time becomes longer.

When the time elapsed from the point of time when the display mode of the web page is set to the other display mode is long, it is likely that the user is away from the terminal, therefore the possibility that others peep at the contents of the web page is high. According to this embodiment, the difficulty of the reset operation increases as the time elapsed from the point of time when the display mode is set to the other display mode becomes longer. The embodiment can more reliably prevent others from peeping at the contents of the web page on the terminal.

Advantageous Effects of Invention

According to an aspect of the present invention, the peeping of the contents of a web page appearing on a terminal by others can be prevented independently of the settings on the terminal.

Figure 5:
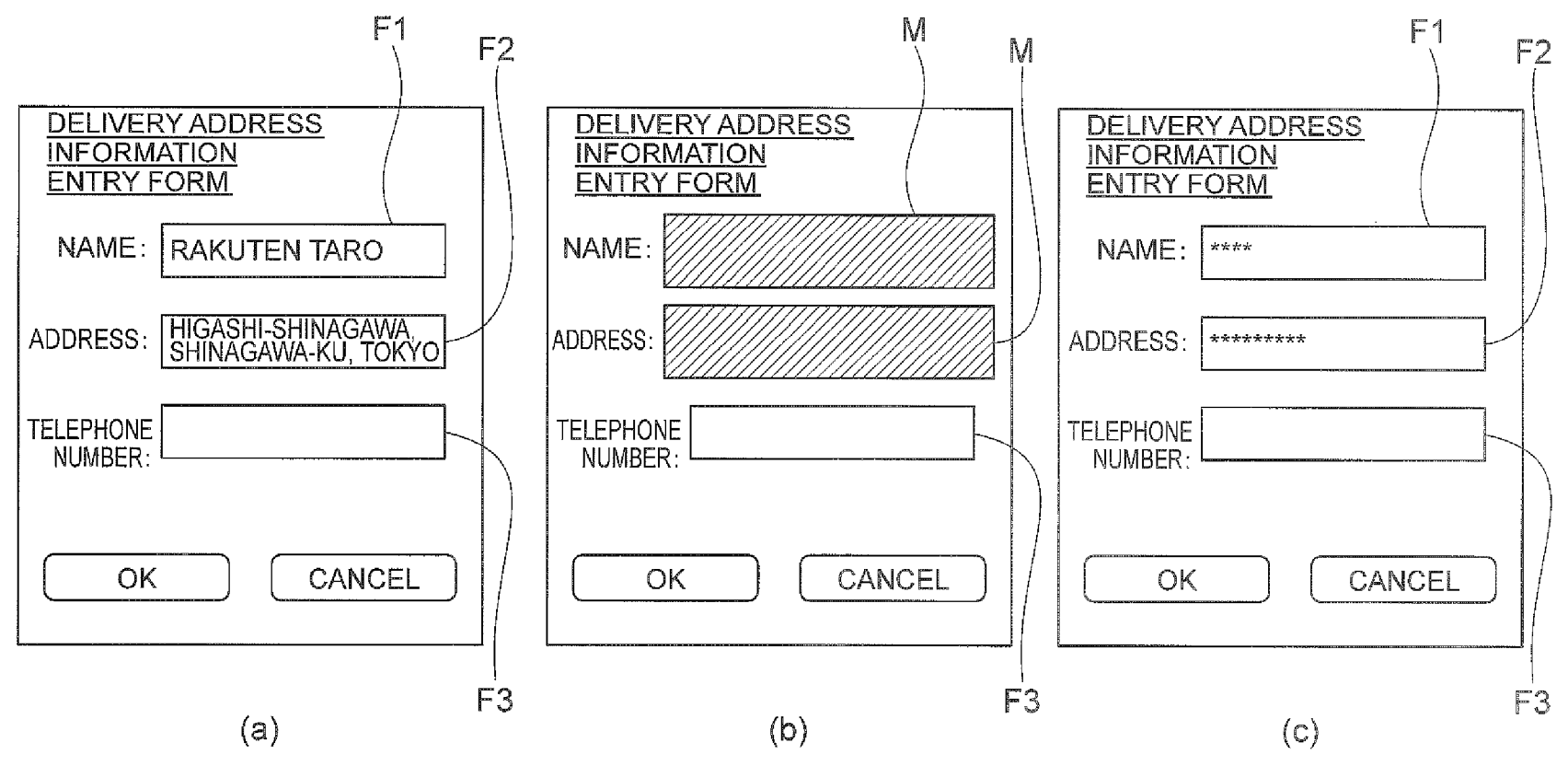

The (a) of FIG. 5 is a diagram showing an example of a web page displayed in a normal display mode, (b) of FIG. 5 is a diagram showing an example of the web page displayed in another display mode, and (c) of FIG. 5 is a diagram showing another example of the web page displayed in the other display mode.

Figure 6:
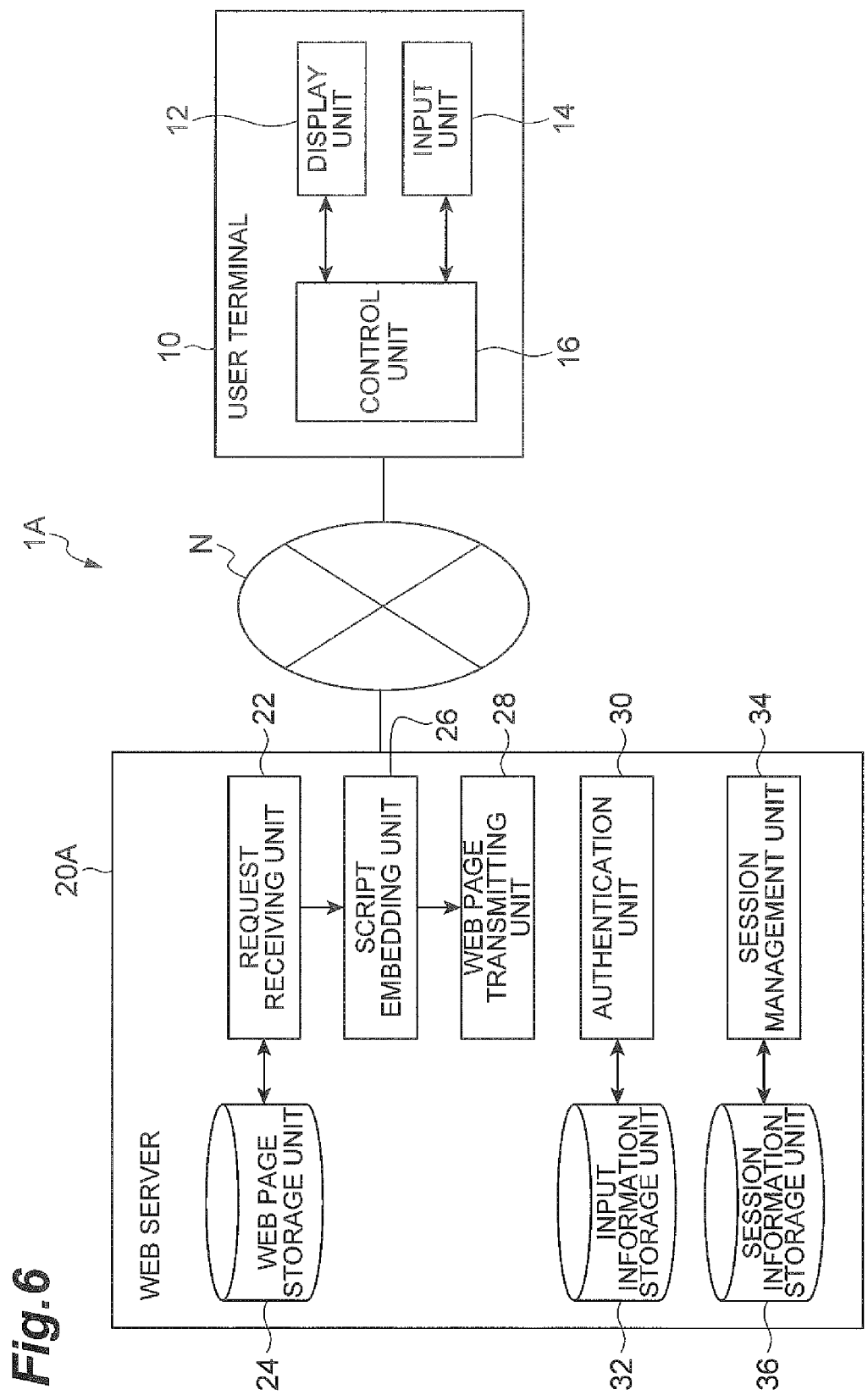

FIG. 6 is a diagram showing a functional configuration of a web server and a user terminal according to a second embodiment.

Figure 7:
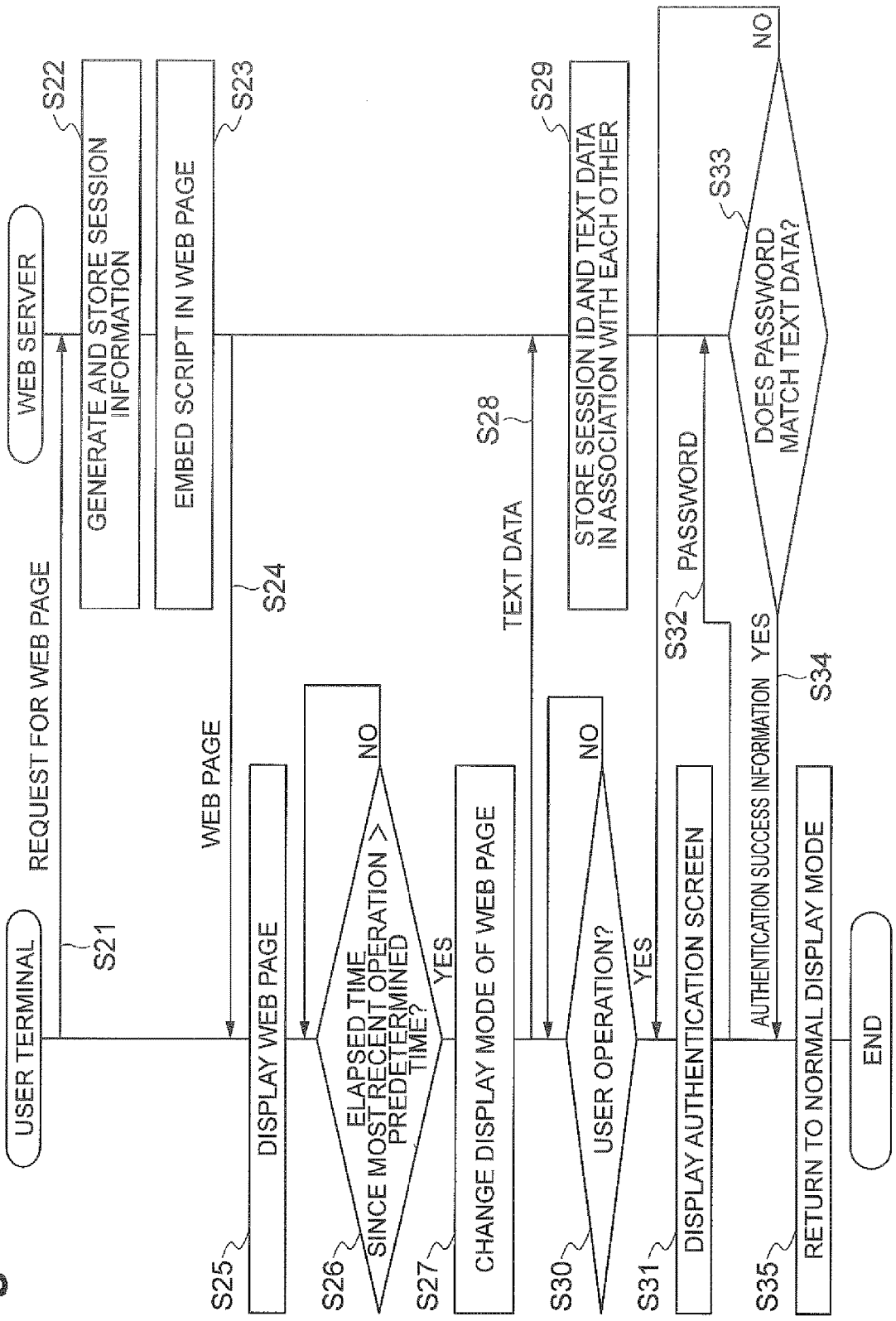

FIG. 7 is a sequence diagram illustrating the operation of the web server and the processing that a script causes the user terminal to execute.

Figure 8:
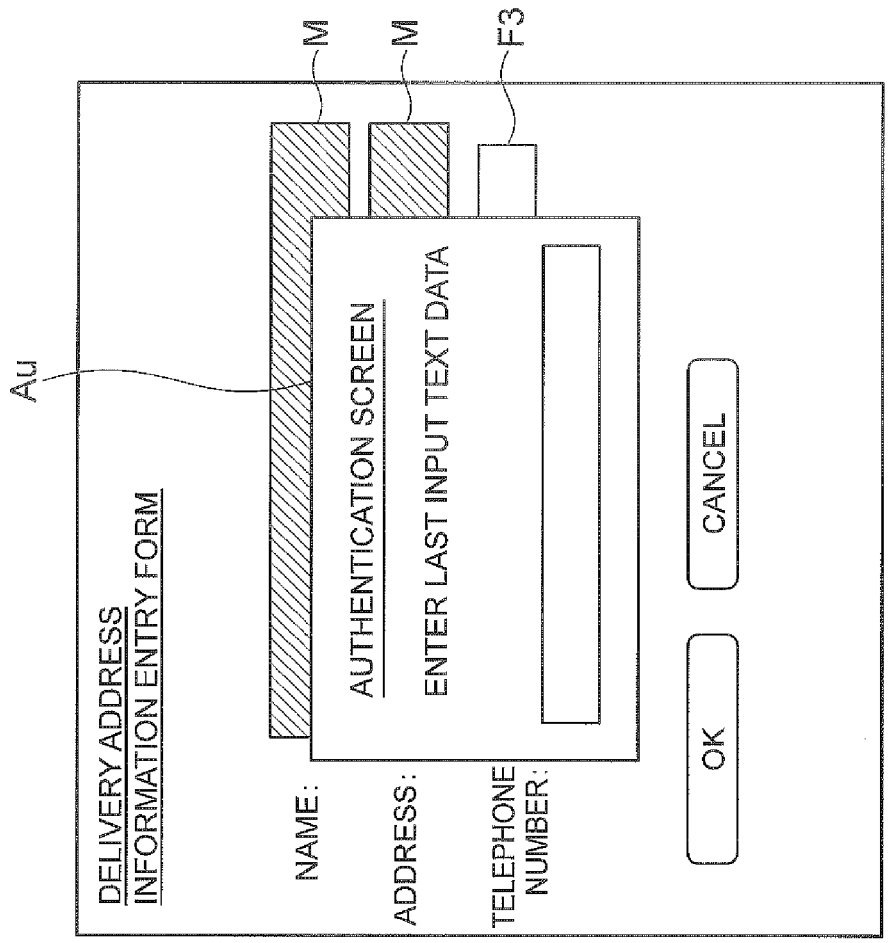

FIG. 8 is a diagram showing an example of an authentication screen displayed in a web page.

Figure 9:
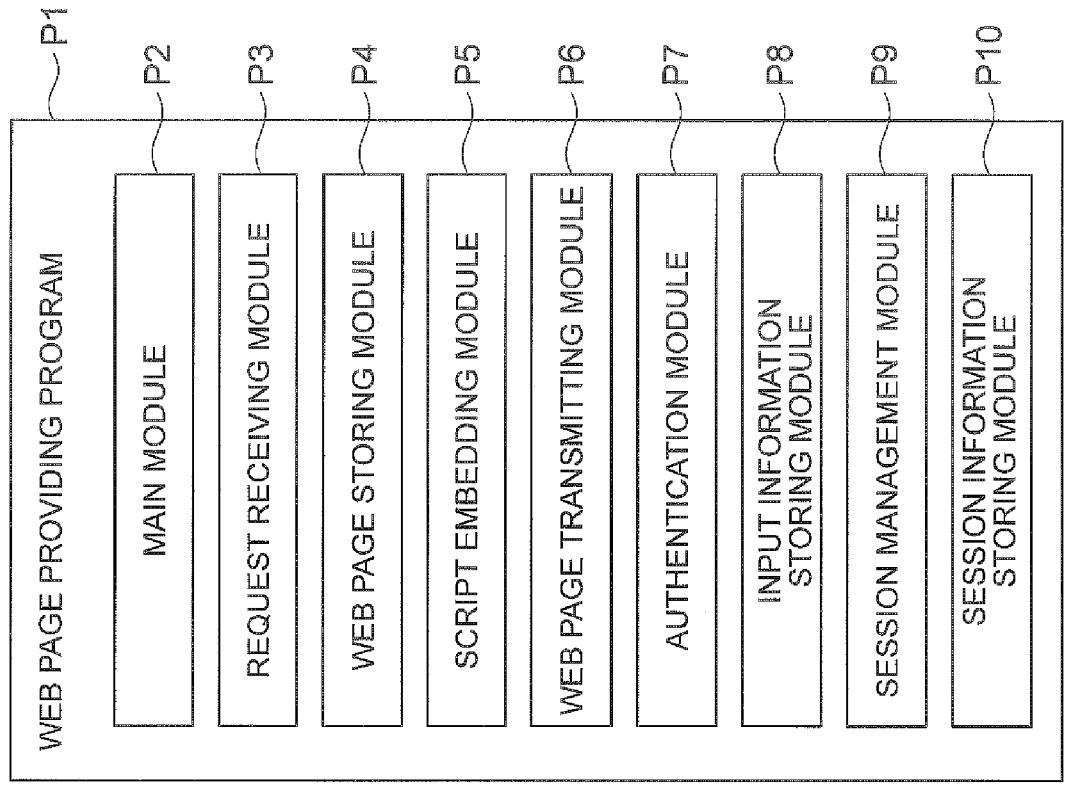

FIG. 9 is a diagram showing a configuration of a web page providing program according to an embodiment.

The (a) of FIG. 10 is a diagram showing an example showing a confirmation page in the normal display mode, and (b) of FIG. 10 is a diagram showing an example of the confirmation page changed into the other display mode.

DESCRIPTION OF EMBODIMENTS

Embodiments of the present invention will be described in detail below with reference to the accompanying drawings. In the description of the drawings, the same or equivalent elements are denoted with the same reference signs, and an overlapping description will be omitted.

(First Embodiment)

Figure 1:
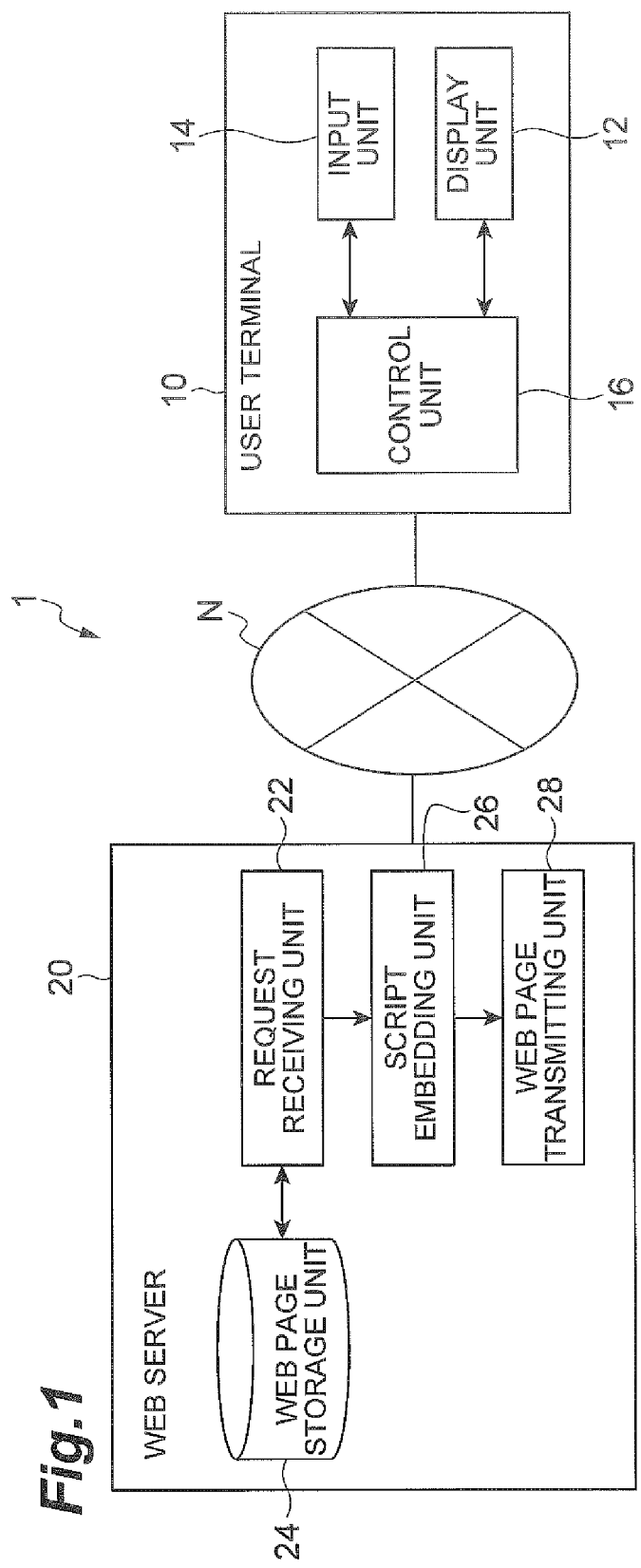
FIG. 1 is a diagram showing a functional configuration of a web server and a user terminal according to a first embodiment.

First of all, a web server (web page providing device) 20 according to a first embodiment will be described. FIG. 1 is a diagram showing a functional configuration of a user terminal 10 and a web server 20. The user terminal 10 and the web server 20 constitute a web page providing system 1. The web page providing system 1 is a computer system that provides a web page to a user and changes display modes of the web page in accordance with terminal operation by the user. The user terminal 10 and the web server 20 are communicably connected to each other through a network N. The network N is, for example, a wired or wireless general-purpose network or dedicated network. Although a single user terminal 10 is connected to the web server 20 in FIG. 1, the number of the user terminals 10 connected to the web server 20 is not particularly limited.

First, referring to FIG. 1, the web server 20 will be described. The web server 20 is a device that provides the user terminal 10 with a web page in which a script that describes processing to be executed by the user terminal 10 is embedded. The web server 20 includes, as functional components, a request receiving unit (receiving unit) 22, a web page storage unit 24, a script embedding unit 26, and a web page transmitting unit (transmitting unit) 28.

Figure 2:
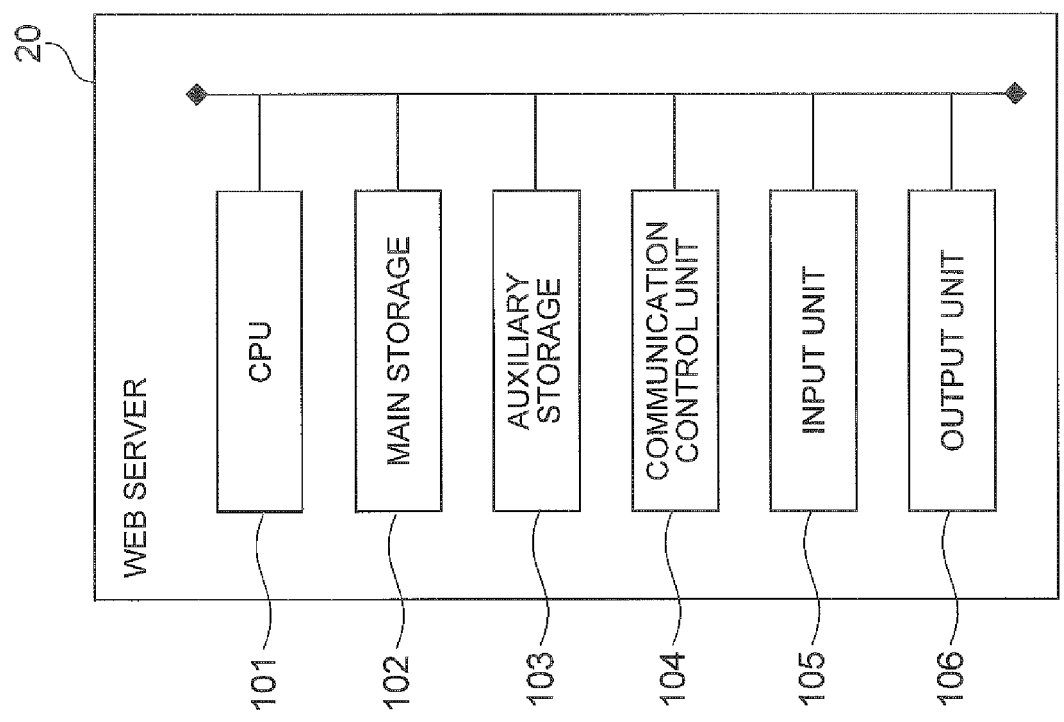
FIG. 2 is a diagram showing a hardware configuration of the web server shown in FIG. 1.

This web server 20 includes a central processing unit (CPU) 101 for executing an operating system and an application program, a main storage 102 including a read-only memory (ROM) and a random-access memory (RAM), an auxiliary storage 103 including a hard disk, a communication control unit 104 including a network card, an input unit 105 including a keyboard and a mouse, and an output unit 106 including a monitor, as shown in FIG. 2. Each function of the web server 20 shown in FIG. 1 is implemented by causing the CPU 101 and the main storage 102 to read thereon predetermined software to operate the communication control unit 104, the input unit 105, the output unit 106, and other units under the control of the CPU 101 to perform data read and write from/into the main storage 102 or the auxiliary storage 103. Data and databases necessary for processing are stored in the main storage 102 or the auxiliary storage 103.

Returning to FIG. 1, the request receiving unit 22 is a functional component that receives a request for a web page from the user terminal 10. The request receiving unit 22 receives a request for a web page from the user terminal 10 and then acquires a web page corresponding to the request from the user terminal 10 from among web pages stored in the web page storage unit 24. The request receiving unit 22 outputs the web page acquired from the web page storage unit 24 to the script embedding unit 26.

The script embedding unit 26 is a functional component that embeds a script in the web page output from the request receiving unit 22, the script describing processing to be executed by the user terminal 10. The script embedded in the web page by the script embedding unit 26 is a script program written in a format that can be interpreted by the browser on the user terminal 10, for example, written in JavaScript (registered trademark). The processing to be executed by the user terminal 10 in accordance with the script will be described later. The script embedding unit 26 outputs the web page having a script embedded therein to the web page transmitting unit 28.

The web page transmitting unit 28 is a functional component that transmits the web page having a script embedded by the script embedding unit 26, as a response to the request from the user terminal 10, to the user terminal 10 through the network N.

The user terminal 10 will now be described. The user terminal 10 is a device equipped with a web browser capable of displaying a web page and executing a script, and examples thereof include mobile phones, smart phones, portable or desktop personal computers, and personal digital assistants (PDAs). The user terminal 10 has the same hardware configuration as the web server 20, and the hardware configuration of the user terminal 10 is not shown. However, specific parts may be different between the user terminal 10 and the web server 20, for example, in that the input device and the output device are implemented by a touch panel in the user terminal 10. In the user terminal 10, the functional components described later are implemented by hardware in the same manner as in the web server 20.

The user terminal 10 includes a display unit 12, an input unit 14, and a control unit 16. The display unit 12 is a functional component that displays information such as a web page and is implemented, for example, by a display device such as a liquid crystal display. The input unit 14 is a functional component that accepts an operation input to the user terminal 10 from the user and is implemented, for example, by a keyboard and/or a mouse.

The control unit 16 is a functional component that controls each function of the user terminal 10. The control unit 16 accepts an operation of requesting a web page from the user and then transmits a request for a web page corresponding to the user operation to the web server 20. When receiving a web page from the web server 20 in response to the request, the control unit 16 displays, on the display unit 12, the received web page. The control unit 16 is configured to execute a script. If the web page includes a script, the control unit 16 executes the script and displays, on the web browser in the display unit 12, a web page in accordance with the result of execution.

The script embedded in the web page by the script embedding unit 26 of the web server 20 and executed in the control unit 16 of the user terminal 10 will now be described. If an elapsed time from the most recent operation input to the user terminal 10 exceeds a predetermined time, this script changes the display mode of the web page from a normal display mode not subjected to the processing of reducing visibility to another display mode with partially reduced visibility.

Figure 3:
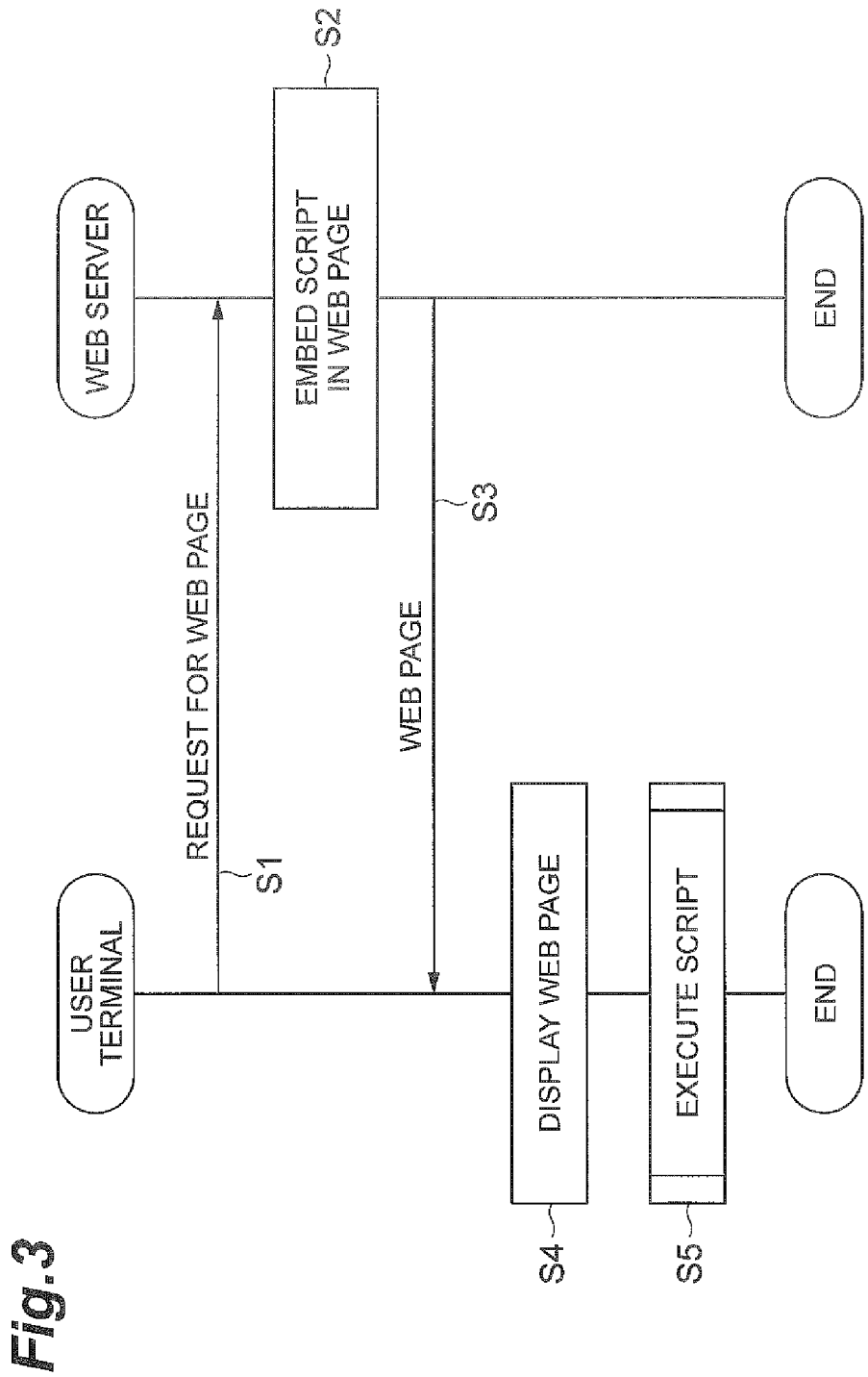
FIG. 3 is a sequence diagram illustrating the operation of the web server and the processing that a script causes the user terminal to execute.

Referring now to FIG. 3, the operation of the web server 20 and a web page providing method according to an embodiment will be described. At the user terminal 10, when the operation of requesting a web page is accepted from the user, the control unit 16 transmits a web page corresponding to the request to the web server 20A (step S1). At the web server 20, when the request from the user terminal 10 is accepted (the request receiving step), the request receiving unit 22 acquires the web page corresponding to the request from the user terminal 10 from the web page storage unit 24, and the script embedding unit 26 embeds a script in the web page (step S2). The web page transmitting unit 28 then transmits the web page having the script embedded in step S2 to the user terminal 10 (step S3).

At the user terminal 10, the control unit 16 displays, on the display unit 12 in the normal display mode, the web page transmitted from the web server 20 (step S4). At the user terminal 10, the script included in the web page is executed in the control unit 16 (step S5).

Figure 4:
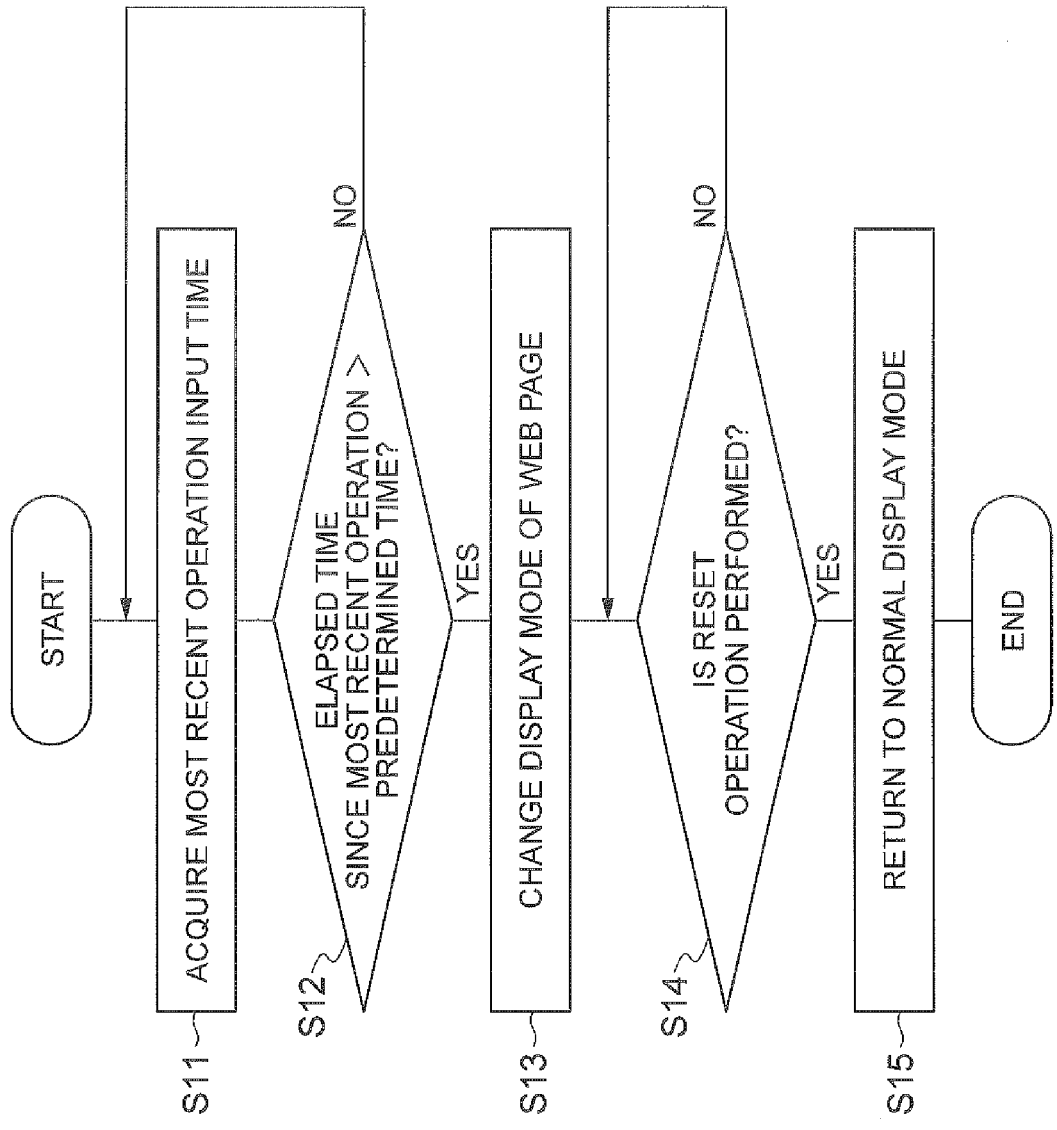
FIG. 4 is a flowchart illustrating the processing executed in the user terminal in accordance with the contents of a script.

Referring to FIG. 4, the processing executed in the user terminal 10 in accordance with the contents of the script will be described. First, the control unit 16 acquires the time when the most recent operation is performed on the user terminal 10 (step S11). The control unit 16 then measures the elapsed time from the most recent operation on the user terminal 10 and determines whether the elapsed time exceeds a predetermined time (step S12, the determination step). The elapsed time from the most recent operation refers to, for example, the length of time during which a key input or an operation with a pointing device such as a mouse is not accepted from the user. If the elapsed time does not exceed the predetermined time, the control unit 16 keeps the web page in the normal display mode and executes the processing in step S11 again.

If it is determined that the elapsed time exceeds the predetermined time, the display mode of the web page is changed from the normal display mode to the other display mode (step S13, the display mode changing step). The other display mode refers to a display mode set such that the contents of the web page appearing on the display unit 12 are unrecognizable or hardly recognized Specifically, mask data is overlapped on part or the whole of the web page appearing on the display unit 12, or the effect that makes it difficult to recognize text appearing on the display unit 12 is applied to the text.

Referring to FIG. 5, an example of changing the display mode of the web page will be described. The (a) of FIG. 5 is an example of a web page displayed in the normal display mode before the display mode is changed in step S13. The web page shown in (a) of FIG. 5 includes entry forms F1 to F3 for inputting a name, an address, and a phone number, respectively. The user's name and address are input in the entry forms F1 and F2. The (b) of FIG. 5 is an example showing the web page shown in (a) of FIG. 5 in which the display mode is changed to the other display mode in step S13. In (b) of FIG. 5, mask data M is combined on the entry forms F1 and F2. The mask data M is an opaque area data for hiding information located in the arranged area. In (b) of FIG. 5, the information about the name and the address (text) input by the user in the entry forms F1 and F2 are thus invisible. The mask data M may be area data that gives the blurring effect to the arranged area.

The (c) of FIG. 5 is another example showing part of the web page shown in (a) of FIG. 5 in which the display mode is changed to the other display mode in step S13. In (c) of FIG. 5, the text input in the entry forms F1 and F2 are converted into unrecognizable characters (here, "*"). In (c) of FIG. 5, the contents of the text input by the user to the entry forms corresponding to "name" and "address" thus cannot be recognized.

In step S13, the display mode of the web page can be changed to a variety of display modes other than the examples shown in FIGS. 5(b) and 5(c). For example, the color of the text input in the entry form may be changed to the same color as the background color of the entry form, or the text input in the entry form may be hidden by applying a <hidden> attribute to the text. The text can be hidden even when the display mode is changed as in those examples. The character size of the text input in the entry form may be reduced, or the text input in one entry form may be moved and displayed in another entry form. The text input in the entry form may be displayed by changing the order at random. The visibility of the text in the entry form can be reduced even when the display mode is changed as in those examples.

Returning to FIG. 4, the control unit 16 determines whether the user of the user terminal 10 performs a reset operation (step S14). The reset operation refers to a terminal operation for returning the display mode of the web page changed in step S13 to the normal display mode. For example, the control unit 16 determines that the reset operation is performed when the user performs a predetermined operation using the input unit 14. Specifically, any given key input or mouse operation by the user can be a reset operation.

If it is determined that a reset operation is not performed by the user in step S14, the control unit 16 waits until a reset operation by the user is performed. If it is determined that a reset operation is performed by the user in step S14, the control unit 16 returns the display mode of the web page from the other display mode to the normal display mode (step S15, the display mode restoring step). The display mode of the web page is thus restored from the state in which the visibility of part of the web page is reduced as shown in FIGS. 5(b) and 5(c) to the state in which the visibility is high as shown in (a) of FIG. 5.

The operational effects of the web server 20 configured as described above will now be described. In response to a request from the user terminal 10, the web server 20 transmits to the user terminal 10 a web page in which a script that describes processing to be executed by the user terminal 10 is embedded. This script causes the user terminal 10 to execute the processing of: if the elapsed time from the most recent operation on the user terminal 10 exceeds a predetermined time, changing the display mode of the web page such that the visibility of part of the web page is reduced; and if the reset operation is thereafter performed by the user of the user terminal 10, returning the display mode of the web page to the normal display mode. As described above, at the web server 20, for example, when the user is away from the terminal and does not operate the user terminal 10 for a predetermined time, the visibility of at least part of the web page is reduced in accordance with the script embedded in the web page. This processing can prevent others from peeping at the contents of the web page appearing on the user terminal 10 independently of the settings on the user terminal 10.

(Second Embodiment)

A web server 20A according to a second embodiment will now be described. FIG. 6 is a diagram showing a functional configuration of the user terminal 10 and the web server 20A. The user terminal 10 and the web server 20A constitute a web page providing system 1A. The web server 20 requests the user of the user terminal 10 to input a password and, if the user inputs a correct password, determines that a reset operation by the user is performed. In the following, the matters different from those in the first embodiment will be mainly described, and a description of the same or equivalent matters as in the first embodiment is omitted.

Referring to FIG. 6, the web server 20A will be described. The web server 20A further includes an authentication unit 30, an input information storage unit 32, a session management unit 34, and a session information storage unit 36, in addition to the request receiving unit 22, the web page storage unit 24, the script embedding unit 26, and the web page transmitting unit 28.

The authentication unit 30 is a functional component that performs authentication for returning the display mode of the web page to the normal display mode. The input information storage unit 32 is a functional component that stores therein text data (text information) input by the user to the entry form in the web page. The session management unit 34 is a functional component that manages session information between the web server 20A and the user terminal 10. The session management unit 34 establishes a session with the user terminal 10, then generates session information in which the session ID and the terminal ID for identifying the user terminal 10 are associated with each other, and stores the session information into the session information storage unit 36.

In the present embodiment, the script embedded in the web page by the script embedding unit 26 causes the control unit 16 of the user terminal 10 to execute additional processing in addition to the processing described in the first embodiment.

Referring to FIG. 7, the operation of the web server 20A and the processing executed by the user terminal 10 in accordance with the script embedded in the web page by the script embedding unit 26 will be described. First, at the user terminal 10, when an operation of requesting a web page is accepted from the user, the control unit 16 transmits the web page corresponding to the request to the web server 20A (step S21). At the web server 20A, when the request from the user terminal 10 is accepted (the request receiving step), the session management unit 34 generates session information that associates the session ID with the terminal ID for identifying the user terminal 10, and stores the session information in the session information storage unit 36 (step S22). At the web server 20A, the request receiving unit 22 then acquires the web page corresponding to the request from the user terminal 10 from the web page storage unit 24, and the script embedding unit 26 embeds a script in the web page (step S23). The web page transmitting unit 28 then transmits the web page having the script embedded therein in step S23 to the user terminal 10 (step S24).

At the user terminal 10, the control unit 16 displays, on the display unit 12 in the normal display mode, the web page transmitted from the web server 20A (step S25). The user inputs text in at least some of a plurality of entry forms included in the web page. At the user terminal 10, the script included in the web page is executed in the control unit 16. First, the control unit 16 measures the elapsed time from the most recent terminal operation by the user and determines whether the elapsed time exceeds a predetermined time (step S26, the determination step).

If the elapsed time does not exceed the predetermined time, the control unit 16 waits until the elapsed time exceeds the predetermined time. If it is determined that the elapsed time exceeds the predetermined time, the control unit 16 changes the display mode of the web page from the normal display mode to the other display mode in which the visibility of at least part of the web page is reduced (step S27, the display mode changing step). At the same time, at the user terminal 10, the control unit 16 transmits the text data input in the entry form in the web page to the web server 20A (step S28, the input information transmitting step). Here, the control unit 16 transmits the text data in the entry form last input by the user, among the entry forms, to the web server 20A.

At the web server 20A, the authentication unit 30 stores the text data transmitted from the user terminal 10 and the session ID corresponding to the user terminal 10A into the input information storage unit 32 in association with each other (step S29).

At the user terminal 10, the control unit 16 determines whether a user operation is performed (step S30). If no user operation is performed, the control unit 16 waits until a user operation is performed with the display mode of the web page kept in the other display mode. If it is determined that a user operation is performed, the control unit 16 displays an authentication screen for allowing the user to input a password (step S31, the authentication requesting step). FIG. 8 shows an example of the authentication screen Au appearing on the web page. The authentication screen Au is a screen for verifying whether the user who attempts an operation on the user terminal 10 is the user identical with the user who inputs text data in the entry form in the web page, and requests input of the text last input by the user as password information for identifying the user. In this case, the text last input by the user serves as a correct password for returning the display mode of the web page to the normal display mode. If the user inputs text in the authentication screen Au, the control unit 16 transmits the text input to the authentication screen (the password input by the user) to the web server 20A (step S32, the password transmitting step).

At the web server 20A, the authentication unit 30 then compares the text data input to the authentication screen Au with the text data in the user terminal 10A stored in the input information storage unit 32 and determines whether the input text data and the stored text data match (step S33). In this determination, it may be determined that the text data input in the authentication screen Au and the text data in the user terminal 10A stored in the input information storage unit 32 match not only in the case of a perfect match but also in the case of a partial match.

In step S33, if the text data input in the authentication screen Au and the text data in the user terminal 10A stored in the input information storage unit 32 match, the authentication unit 30 transmits authentication success information indicating that the authentication is successful to the user terminal 10 (step S34). At the user terminal 10, when this authentication success information is received from the web server 20A, the control unit 16 assumes that the user performs a reset operation, and returns the display mode of the web page to the normal display mode (step S35). If the text data input in the authentication screen Au and the text data in the user terminal 10A stored in the input information storage unit 32 do not match, the process returns to step S31, and the control unit 16 displays the authentication screen again.

The web server 20A described above also exerts the same operational effects as those of the web server 20. The web server 20A causes the user terminal 10 to further execute a script that transmits the text data input in the entry form in the web page and the password input by the user in the authentication screen Au to the web server 20A and, if the text data and the password at least partially match, returns the display mode of the web page to the normal display mode. The web server 20A as described above can prevent others who do not know the text input to the entry forms F1 to F3 from returning the display mode of the web page to the normal display mode.

In the present embodiment, authentication as to whether the text data input to the entry form in the web page and the password input by the user in the authentication screen Au match is performed at the web server 20A. Supposing that this authentication is performed only on the user terminal 10 side, the correct password for returning the display mode of the web page to the normal display mode is stored in a variable of the script while the display mode of the web page is set in the other display mode. The content of the variable can be acquired even by others, for example, using a debug mode. Therefore, if the authentication is performed only on the user terminal 10 side, the correct password is exposed to others, and others may perform unauthorized authentication. By contrast, in the present embodiment, the authentication is performed by the web server 20A. Hence, even when others see the web page, for example, in a debug mode, with the intention of seeing the variable in the script, exposure of the correct password to others can be prevented. This processing therefore more reliably prevents others from peeping at the contents of the web page appearing on the user terminal 10.

Referring now to FIG. 9, a web page providing program P1 for causing a computer to execute a series of processing described above will be described. FIG. 9 is a diagram showing a configuration of the web page providing program P1 according to an embodiment. The program is applied to the terminal to cause a server to operate as the web server 20A having the above-described functions.

The web page providing program P1 includes a main module P2, a request receiving module P3, a web page storing module P4, a script embedding module P5, a web page transmitting module P6, an authentication module P7, an input information storing module P8, a session management module P9, and a session information storing module P10.

The main module P2 is a module centrally controlling communication. The functions implemented by executing the request receiving module P3, the web page storing module P4, the script embedding module P5, the web page transmitting module P6, the authentication module P7, the input information storing module P8, the session management module P9, and the session information storing module P10 are the same as the functions of the request receiving unit 22, the web page storage unit 24, the script embedding unit 26, the web page transmitting unit 28, the authentication unit 30, the input information storage unit 32, the session management unit 34, and the session information storage unit 36, respectively.

The web page providing program P1 is recorded on a tangible recording medium such as, for example, a compact disc-read-only memory (CD-ROM), a digital versatile disk-read only memory (DVD-ROM), and a semiconductor memory and provided. The web page providing program P1 may be provided through the network N as a data signal superimposed on a carrier wave.

Although a variety of embodiments have been described above, the present invention is not limited to the foregoing embodiments, and a variety of modifications can be made. Various modifications of the present invention will be described below.

According to an embodiment, the web server 20A may cause the user terminal 10 to execute a script that returns the display mode of the web page to the normal display mode without requesting input of a password in the authentication screen Au, depending on the stock state of the item ordered by the user or the session state between the user terminal 10 and the web server 20A.

For example, when the web page corresponding to the request from the user terminal 10 is an order page for inputting information necessary for purchasing an item, the web server 20A may embed a script performing the following processing in the web page and cause the user terminal 10 to execute the embedded script. In this case, at the user terminal 10, if it is detected that the item ordered by the user is out of stock by referring to item information for the item while the display mode of the order page is the other display mode, the display mode of the order page may be returned to the normal display mode without requesting input of a password in the authentication screen Au in step S31. In this case, input of a password in the authentication screen Au is not requested, thereby avoiding causing the user to perform an unnecessary operation.

When the session between the user terminal 10 and the web server 20A is disconnected while the display mode of the web page is set in the other display mode, the display mode of the order page may be returned to the normal display mode without requesting input of a password in the authentication screen Au in step S31. In this case, input of a password in the authentication screen Au is not requested, thereby avoiding causing the user to perform an unnecessary operation.

According to an embodiment, the web server 20A may cause the user terminal 10 to execute a script that changes the area with reduced visibility according to whether the web page for which a display mode is to be changed is an entry page including an entry form configured to receive text or is a confirmation page for confirming the information input in the entry page. The (a) FIG. 5 described above is an example showing the entry page in the normal display mode, and (b) of FIG. 5 described above is an example of the entry page changed into the other display mode. As shown in (b) of FIG. 5, when the web page is an entry page, the name and the address of the user input in the entry forms F1 and F2 are hidden by the mask data M. By contrast, the mask data M is not combined in the entry form in which no text is input by the user.

The (a) of FIG. 10 is an example showing a confirmation page in the normal display mode, and (b) of FIG. 10 is an example of the confirmation page changed into the other display mode. The confirmation page includes display areas C1, C2, and C3. Information input to the entry forms F1 to F3 in the entry page shown in (a) of FIG. 5 is displayed in the display areas C1 to C3. In the example shown in (a) of FIG. 10, the user's name and address input by the user are displayed as confirmation information in the display areas C1 and C2, respectively, and no confirmation information is displayed in the display area C3. That is, information about the name and the address is information input in the entry page, and information about the telephone number is information not input in the entry page. As shown in (b) of FIG. 10, when the web page is a confirmation page, mask data M is combined in all of the display areas C1 to C3, That is, when the web page is a confirmation page, the display mode is changed such that the text information input to the entry forms F1 to F3 is indistinguishable from the information not input to the entry forms F1 to F3.

According to this embodiment, when the web page appearing on the terminal is an entry page, the display mode of the entry page is changed such that the visibility of the information input to the entry forms F1 to F3 is reduced, so that the user can grasp which of the entry forms F1 to F3 has been filled in, By contrast, when the web page appearing on the terminal is a confirmation page, the display mode of the confirmation page is changed such that the information input to the entry forms F1 to F3 is indistinguishable from the information not input to the entry forms F1 to F3, thereby preventing others from knowing which of the entry folios F1 to F3 the user has filled in and which of the entry forms F1 to F3 the user has not filled in.

According to an embodiment, the web server 20A may acquire the wait time until screen lock is run as set in the user terminal 10 and may set the elapsed time until the display mode of the web page is changed to the other display mode to be shorter than the wait time. In this case, changing the display mode by the script can be combined with the screen lock by the terminal. The visibility of at least part of the web page can be reduced earlier than when the screen lock is run in the user terminal 10, whereby others are more reliably prevented from peeping at the contents of the web page appearing on the user terminal 10.

The web server 20A may cause the user terminal 10 to execute a script that measures the time elapsed from the point of time when the display mode of the web page is set to the other display mode and changes the content of the reset operation such that the difficulty of the reset operation increases as the elapsed time becomes longer. For example, if a first time (for example, 1 minute) has passed since the display mode of the web page is set to the other display mod; the display mode of the web page may be returned to the normal display mode, for example, through an operation on the mouse by the user without requesting input of a password in the authentication screen Au.

If a second time (for example, 3 minutes) longer than the first time has passed since the display mode of the web page is set to the other display mode, input of a password in the authentication screen Au may be requested, and, if the password input by the user matches part of the text data input to the entry form, the display mode of the web page may be returned to the normal display mode. If a third time (for example, 5 minutes) longer than the second time has passed since the display mode of the web page is set to the other display mode, input of a password in the authentication screen Au may be requested, and, if the password input by the user perfectly matches the text data input to the entry form, the display mode of the web page may be returned to the normal display mode.

In the foregoing embodiments, the script is embedded in the web page, and the web page having the script embedded therein is transmitted to the user terminal 10. However, the web servers 20 and 20A may not necessarily transmit the web page having the script embedded therein to the user terminal 10 as long as a web page from which the script is readable is transmitted to the user terminal 10. For example, the web page transmitting unit 28 in the web servers 20 and 20A may transmit to the user terminal 10 the web page that reads out and executes an external script for executing the above-described processing.

In the foregoing embodiments, the visibility of part of the web page is reduced when the display mode is set to the other display mode. According to an embodiment, the visibility of the entire web page may be reduced. In FIG. 1 and FIG. 6, the web servers 20 and 20A are each configured with a single computer. However, the functions of the web servers 20 and 20A may be distributed over a plurality of computers. For example, the web servers 20 and 20A each may be configured with a computer having a database function and a computer having other functions.

REFERENCE SIGNS LIST 1, 1A . . . web page providing system, 10, 10A . . . user terminal, 12 . . . display unit, 14 . . . input unit, 16 . . . control unit, 20, 20A . . . web server, 22 . . . request receiving unit, 24 . . . web page storage unit, 26 . . . script embedding unit, 28 . . . web page transmitting unit, 30 . . . authentication unit, 32 . . . input information storage unit, 34 . . . session management unit, 36 . . . session information storage unit, Au . . . authentication screen, F1, F2, F3 . . . entry form.

The invention claimed is:

1. A web page providing method, performed by a computer, comprising:
receiving a request for a web page from a terminal; and
transmitting to the terminal the web page, wherein the web page is an order page for inputting information necessary for purchasing an item, and wherein the terminal executes a script code that causes the terminal to:
measure an elapsed time from a most recent operation on the terminal by a user of the terminal, wherein the most recent operation is the last operation of the user in time,
determine whether the elapsed time exceeds a predetermined time;
when it is determined that the elapsed time exceeds the predetermined time, change a display mode of the web page from a first display mode to a second display mode in which visibility of at least part of the web page is reduced;
restore the display mode of the web page to the first display mode in a case where a reset operation is performed by the user of the terminal when the display mode of the web page is the second display mode,
determine whether the item is out of stock, and
when it is determined that the item is out of stock and the display mode of the order page is the second display mode, the display mode of the order page is restored to the first display mode without requesting input of a password in an authentication screen.

2. A web page providing device comprising:
at least one memory operable to store program code; and
at least one processor operable to read said program code and operate according to said program code, said program code including:
receiving code configured to cause at least one of said at least one processor to receive a request for a web page from a terminal, wherein the web page is an order page for inputting information necessary for purchasing an item; and
transmitting code configured to cause at least one of said at least one processor to transmit to the terminal the web page, wherein the terminal executes a script code that causes the terminal to:
measure an elapsed time from a most recent operation on the terminal by a user of the terminal, wherein the most recent operation is the last operation of the user in time,
determine whether the elapsed time exceeds a predetermined time, when it is determined that the elapsed time exceeds the predetermined time, change a display mode of the web page from a first display mode to a second display mode in which visibility of at least part of the web page is reduced;

restore the display mode of the web page to the first display mode in a case where a reset operation is performed by the user of the terminal when the display mode of the web page is the second display mode; and the at least one processor is further configured to determine whether the item is out of stock, and when it is determined that the item is out of stock and the display mode of the order page is the second display mode, the display mode of the order page is restored to the first display mode without requesting input of a password in an authentication screen.

3. The web page providing device according to claim 2, wherein the web page includes an entry form configured to receive text information, when the display mode of the web page is the second display mode, the script code causes the terminal to display the authentication screen, wherein the user inputs a password on the authentication screen, and when the password input in the authentication screen matches at least part of the text information input to the entry form, it is determined that the reset operation is performed.

4. The web page providing device according to claim 3, wherein when it is determined that the elapsed time exceeds the predetermined time, the script code causes the terminal to:

transmit the text information input in the entry form to the web page providing device; and transmit the password input by the user in the authentication screen to the web page providing device, the web page providing device further includes an authentication code configured to cause at least one of said at least one processor to determine whether the transmitted password matches at least part of the transmitted text information, and when it is determined that the password and the text information match, transmit information indicating authentication success to the terminal, and when the information indicating authentication success is accepted from the web page providing device, it is determined that the reset operation is performed.

5. The web page providing device according to claim 3, further comprising session management code configured to cause at least one of said at least one processor to manage a session state with the terminal, wherein when a session with the terminal is disconnected while the display mode of the web page is set in the second display mode, the display mode of the web page is returned to the first display mode without requesting input of a password in the authentication screen.

6. The web page providing device according to claim 2, wherein in cases where the web page appearing on the terminal is an entry page including an entry form configured to receive text information, the display mode of the entry page is changed, wherein in the changed display mode of the entry page, visibility of text information input in the entry form is reduced, and in cases where the web page appearing on the terminal is a confirmation page for confirming information input in the entry page, a display mode of the confirmation page is changed, wherein in the changed display mode of the confirmation page, text information input in the entry form is identical to an empty entry form.

7. The web page providing device according to claim 2, wherein the script code causes the terminal to acquire a wait time, wherein the wait time defines the time until a screen lock is run in the terminal, and sets the predetermined time to be shorter than the wait time.

8. The web page providing device according to claim 2, wherein a time elapsed from a point of time when the display mode of the web page is set to the second display mode is measured, and the content of the reset operation is changed, wherein difficulty of the reset operation increases as the elapsed time becomes longer.

9. A non-transitory computer-readable medium storing a web page providing program causing a computer to:

receive a request for a web page from a terminal, wherein the web page is an order page for inputting information necessary for purchasing an item; and transmit to the terminal the web page, wherein the terminal executes a script code that causes the terminal to:

measure an elapsed time from a most recent operation on the terminal by a user of the terminal, wherein the most recent operation is the last operation of the user in time, determine whether the elapsed time exceeds a predetermined time;

when it is determined that the elapsed time exceeds the predetermined time, change a display mode of the web page from a first display mode to a second display mode in which visibility of at least part of the web page is reduced; and restoring the display mode of the web page to the first display mode in a case where a reset operation is performed by the user of the terminal when the display mode of the web page is the second display mode;

determine whether the item is out of stock; and when it is determined that the item is out of stock and the display mode of the order page is the second display mode, the display mode of the order page is restored to the first display mode without requesting input of a password in an authentication screen.

\* \* \* \* \*